(12) United States Patent
Cherkasova et al.

(10) Patent No.: US 9,223,622 B2
(45) Date of Patent: Dec. 29, 2015

(54) CAPACITY PLANNING OF MULTI-TIERED APPLICATIONS FROM APPLICATION LOGS

(75) Inventors: Ludmila Cherkasova, Sunnyvale, CA (US); Ningfang Mi, Williamsburg, VA (US); Mehmet Kivanc Ozonat, Mountain View, CA (US); Julie A. Symons, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1571 days.

(21) Appl. No.: 12/252,053

(22) Filed: Oct. 15, 2008

(65) Prior Publication Data

US 2010/0094992 A1    Apr. 15, 2010

(51) Int. Cl.
| | |
|---|---|
| G06F 15/173 | (2006.01) |
| G06F 9/50 | (2006.01) |
| H04L 12/24 | (2006.01) |
| H04L 12/26 | (2006.01) |
| H04L 29/08 | (2006.01) |

(52) U.S. Cl.
CPC .......... *G06F 9/5011* (2013.01); *H04L 41/0896* (2013.01); *H04L 41/145* (2013.01); *H04L 43/08* (2013.01); *H04L 67/22* (2013.01); *G06F 2209/5019* (2013.01)

(58) Field of Classification Search
USPC ............................... 709/225; 714/38; 370/378
See application file for complete search history.

(56) References Cited

U.S. PATENT DOCUMENTS

| | | | | |
|---|---|---|---|---|
| 5,725,770 | A * | 3/1998 | Henry ............................ | 210/603 |
| 5,825,770 | A * | 10/1998 | Coady et al. .................. | 370/378 |
| 5,960,200 | A * | 9/1999 | Eager et al. ................... | 717/147 |
| 6,986,053 | B1 * | 1/2006 | Schwartz et al. .............. | 713/193 |
| 7,370,163 | B2 * | 5/2008 | Yang et al. .................... | 711/162 |
| 2005/0273667 | A1 * | 12/2005 | Shrivastava et al. ............ | 714/38 |

OTHER PUBLICATIONS

R. Jain, The Art of Computer Systems Performance Analysis: Techniques for Experimental Design, Measurement, Simulation, and Modeling, Wiley-Interscience, New York, NY, Apr. 1991, ISBN:0471503361, Chapter 34, pp. 570-579.

* cited by examiner

*Primary Examiner* — Tammy Nguyen
(74) *Attorney, Agent, or Firm* — Hewlett-Packard Patent Department

(57) ABSTRACT

One embodiment collects performance data for an application server that processes transactions received from a client computer to a database server. An application log is created from the performance data and used for capacity planning in a multi-tiered architecture.

12 Claims, 5 Drawing Sheets

CAPACITY PLANNING OF MULTI-TIERED APPLICATIONS FROM APPLICATION LOGS

CROSS-REFERENCE TO RELATED APPLICATIONS

This application relates to commonly assigned U.S. patent application having Ser. No. 11/684,567 filed on Mar. 9, 2007 and U.S. patent application having Ser. No. 11/684,569 filed on May 9, 2007, both of which are incorporated herein by reference.

This application claims the benefit of U.S. Provisional Application Ser. No. 61/048,161, filed Apr. 25, 2008, titled "Capacity Planning Of Multi-tiered Applications From Application Logs" which is hereby incorporated by reference herein as if reproduced in full below.

BACKGROUND

In order to provide high-quality services to customers, internet service providers perform capacity planning to ensure that they can adequately service the demands placed on their systems and provide responses to requests in sufficiently fast time.

As information technology (IT) and application infrastructures become more complex, predicting and controlling system performance and capacity planning have become a difficult task to many organizations. For larger IT projects, it is not uncommon for the cost factors related to performance tuning, performance management, and capacity planning to result in the largest and least controlled expense. Furthermore, application performance issues have an immediate impact on customer satisfaction. A sudden slowdown of an enterprise-wide application can affect a large population of customers, can lead to delayed projects, and ultimately can result in company financial loss.

Traditional capacity planning techniques are often inadequate for accurately predicting resource needs. In many cases, the workload actually encountered by a deployed system does not correspond with a synthetic workload that was expected for the system. Further, workloads often include composite transactions (i.e., a single transaction comprising a plurality of transactions), and determining a resource cost for such composite transactions is challenging for system designers.

DETAILED DESCRIPTION

Figure 1:
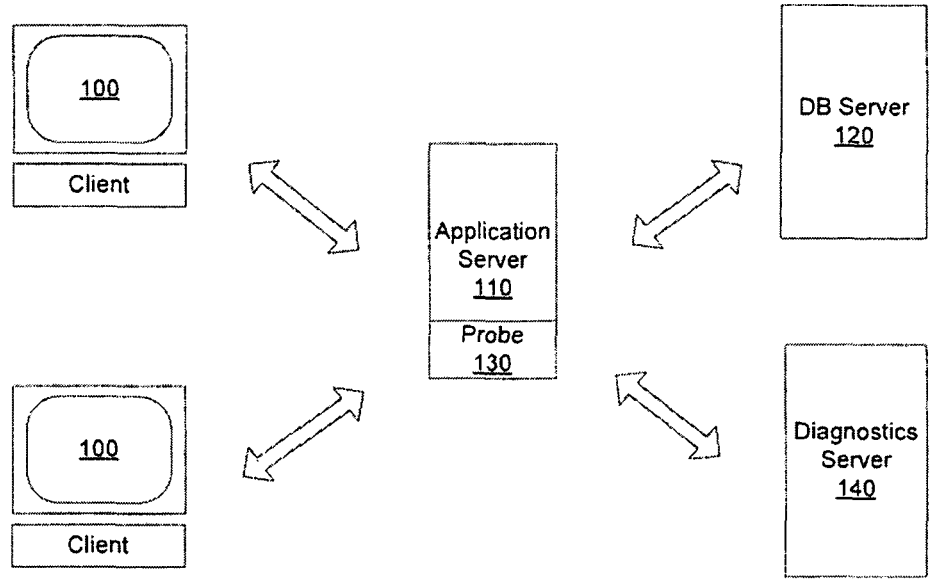
FIG. 1 is a multi-tier architecture with a diagnostics tool in accordance with an exemplary embodiment of the present invention.

Exemplary embodiments in accordance with the present invention are directed to systems and methods for capacity planning of multi-tier applications via enhanced information from application logs.

Exemplary embodiments are described in the context of multi-tier architectures for developing scalable client-server applications. Exemplary embodiments design effective and accurate performance models that predict behavior of multi-tier applications when they are placed in an enterprise production environment and operate under real workload mix. One embodiment is a capacity planning framework that enables designers to accurately answer capacity planning questions for an existing production system with real workload mix. The framework is based on the following three components: an online workload profiler, a regression-based solver, and an analytical model. Generally, the online workload profiler extracts information on a number of processed transactions and outbound database (DB) calls of these transactions. The regression-based solver derives Central Processing Unit (CPU) demand of each application transaction on given hardware platform and estimates the cost of each outbound DB call. Finally, the analytical model is based on a network of queues that represent different tiers of the multi-tier application.

In multi-tiered systems, frequent calls to application servers and the databases place a heavy load on system resources. In turn, these loads create throughput bottlenecks and high server-side processing latency. Exemplary embodiments provide accurate estimation of application behavior for typical client requests and thus reduce or eliminate such bottlenecks and latency. With this performance evaluation, exemplary embodiments address specific system questions such as one or more of the following: How many additional clients can be supported by the existing system while still providing the same performance guarantees (e.g., response time under a specified number of seconds)? How many additional clients can be supported by the existing system assuming that new clients perform similar activities as already existing clients in the system, i.e., the system processes the same type of workload? If the current client population doubles then what is the expected system response time?

Exemplary embodiments provide a framework and methodology to accurately answer these questions for an existing production system with existing workload mix. As noted, this framework includes a workload profiler, regression-based solver, and an analytic model. The workload profiler extracts information on the number of processed transactions and their outbound DB calls. Using statistical regression, the regression-based solver approximates the resource cost (e.g., CPU demand) of each application transaction on given hardware and estimates the CPU cost of each outbound DB call. Thus a real workload mix is directly mapped into the corresponding CPU demand requirements. For capacity planning of multi-tier applications with session-based workloads, an analytical model based on network of queues is developed where the queues represent different tiers of the application.

Some capacity planning techniques require the service provider to collect information about (1) the application server access log that reflects all processed client requests and client activities at the site and (2) CPU utilization at all tiers of the evaluated system. Typically, there are no standard application logs so such capacity planning techniques can complicate an automated approach. Further, for different services and application, customized scripts and programs are written to provide the information about transactions listed above. Exemplary embodiments eliminate these requirements and provide a diagnostics tool that creates representative and unified application logs.

FIG. 1 is a multi-tier architecture with a diagnostics tool in accordance with an exemplary embodiment of the present invention. For illustration, a three-tier architecture is shown.

In a three-tier architecture for an application, the application comprises the following three tiers: (1) an interface tier (sometimes referred to as the web server or the presentation tier), (2) an application tier (sometimes referred to as the logic or business logic tier), and (3) a data tier (e.g., database tier). There are also plural client computers 100 that communicate with the multiple tiers and provide a user interface, such as a graphical user interface (GUI), with which the user interacts with the other tiers. The second tier is shown as an application server 110 that provides functional process logic. The application tier can, in some implementations, be multi-tiered itself (in which case the overall architecture is called an "n-tier architecture"). For example, the web server tier (first tier) can reside on the same hardware as the application tier (second tier). The third tier is shown as a database server 120 and manages the storage and access of data for the application. In one embodiment, a relational database management system (RDBMS) on a database server or mainframe contains the data storage logic of the third tier.

In one embodiment, the three tiers are developed and maintained as independent modules (for example, on separate platforms). Further, the first and second tiers can be implemented on common hardware (i.e., on a common platform), while the third tier is implemented on a separate platform. Any arrangement of the three tiers (i.e., either on common hardware or across separate hardware) can be employed in a given implementation. Furthermore, the three-tier architecture is generally intended to allow any of the three tiers to be upgraded or replaced independently as requirements, desires, and/or technology change.

One embodiment extracts logs with a Diagnostics tool. This Diagnostics tool collects data from the instrumentation with low overheads and minimum disruption to the transaction. By way of example, the tool provides solutions for various applications, such as J2EE applications, .NET applications, ERP/CRM systems, etc. One example of a Diagnostics tool is a Mercury Diagnostics tool, but exemplary embodiments are not limited to a specific type or manufacturer of such tools.

In one embodiment, the Diagnostics tool consists of two components: a Diagnostics probe 130 in the application server 110 and a Diagnostics server 140. The Diagnostics tool collects performance and Diagnostic data from applications without the need for application source code modification or recompilation. It uses byte code instrumentation and industry standards for collecting system and Java Management Extensions (JMX) metrics. Instrumentation refers to byte code that the Diagnostic probe inserts into the class files of application as the applications are loaded by the class loader of a virtual machine. Instrumentation enables the probe 130 to measure execution time, count invocations, retrieve arguments, catch exceptions and correlate method calls and threads.

The Diagnostics probe 130 is responsible for capturing events from the application, aggregating the performance metrics, and sending these captured performance metrics to the Diagnostics server 140. In a monitoring window, the Diagnostics tool provides one or more of the following information for each transaction type:

(1) A transaction count.
(2) An average overall transaction latency for observed transactions. The overall latency includes transaction processing time at the application server 110 as well as all related query processing at the database server 120, i.e., the latency is measured from the moment of the request arrival at the application server to the time when a prepared reply is sent back by the application server 110 (see FIG. 2).
(3) A count of outbound (database) calls of different types.
(4) An average latency of observed outbound calls (of different types). The average latency of an outbound call is measured from the moment the database request is issued by the application server 110 to the time when a prepared reply is returned back to the application server, i.e., the average latency of the outbound call includes database processing and the communication latency.

One exemplary embodiment implements a Java-based processing utility for extracting performance data from the Diagnostics server 140 in real-time. This utility creates an application log that provides complete information on all the transactions processed during the monitoring window, their overall latencies, outbound calls, and the latencies of the outbound calls.

Assuming that there are totally M transaction types processed by the application server 110, the following notations are used:

(1) T=1 min is the length of the monitoring window;
(2) $N_i$ is the number of transactions $Tr_i$, i.e., i-th type, where $1 \le i \le M$;
(3) $R_i$ is the average latency of transaction $Tr_i$;
(4) $P_i$ is the total number of types of outbound DB calls for transaction $Tr_i$;
(5) $N_{i,j}^{DB}$ is the number of DB calls for each type j of outbound DB call for transaction $Tr_i$, where $1 \le j \le P_i$;
(6) $R_{i,j}^{DB}$ is the average latency for each type j of outbound DB call, where $1 \le j \le P_i$;
(7) $U_{CPU,n}$ is the average CPU utilization at the n-tier during this monitoring window (e.g., n=2 for TPC-W).

Table 1 shows a fragment of an enhanced application log for a 1-minute time monitoring window.

TABLE 1

| time | $N_1$ | $R_1$ | ... | $N_M$ | $R_M$ | $N_{1,1}^{DB}$ | $R_{1,1}^{DB}$ | ... | $N_{1,Pi}^{DB}$ | $R_{1,Pi}^{DB}$ | ... | $U_{CPU}$ |
|---|---|---|---|---|---|---|---|---|---|---|---|---|
| 1 min | 28, | 4429.5 | ... | 98, | 1122.9 | 56, | 1189.7 | ... | 28, | 1732.2 | ... | 8.3% |
| 2 min | | ... | ..., | ... | | | ... | ..., | ... | ... | ... | ... |

If the solution has multiple application servers in the configuration then there are multiple diagnostics probes installed at each application server. Further in one embodiment, each probe independently collects data at these application servers supported by, for example, heterogeneous machines with different CPU speeds. Data processing is done for each probe separately.

Figure 2:
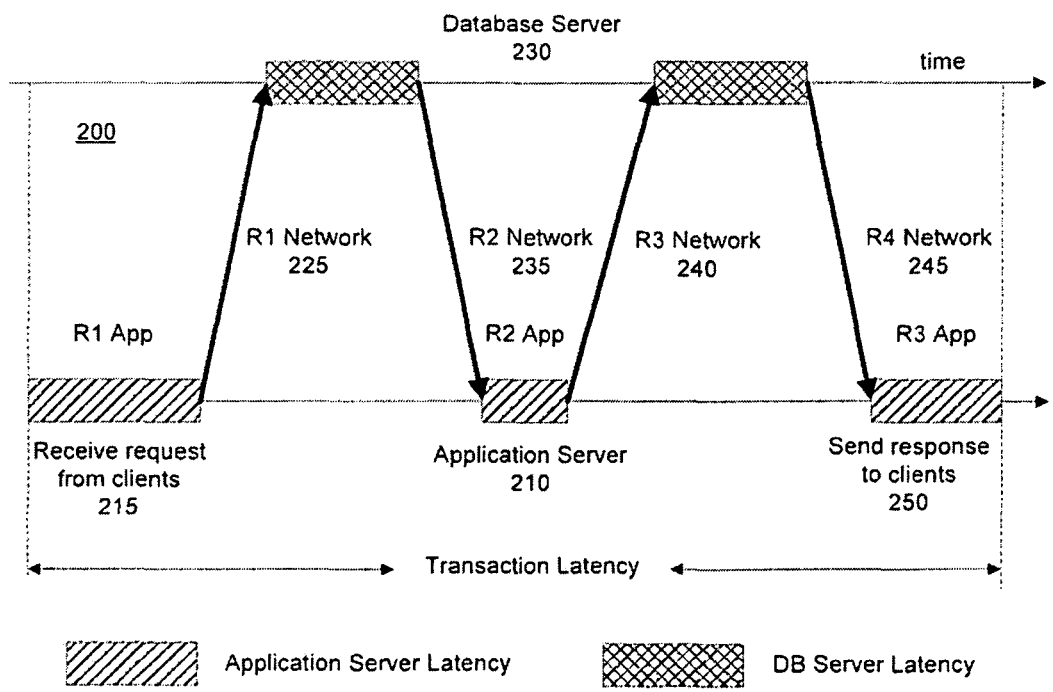
FIG. 2 is diagram showing transaction latency measured by a diagnostics tool in accordance with an exemplary embodiment of the present invention.

FIG. 2 is diagram 200 showing transaction latency measured by the diagnostics tool in accordance with an exemplary embodiment of the present invention. The application server 210 receives a request from clients 215. This request (R1

App) is routed over a network (R1 network 225) to the database server 230. The database server processes the request and transmits a response (R2 network 235) over the network and back to the application server 210. Here, the application server processes the response and transmits a request (R3 network 240) back to the database server 230 for processing. In turn, the database server 230 transmits the response (R4 network 245) over the network to the application server 210. This response is sent to the client 250.

As shown in FIG. 2, transaction latencies accumulate at various stages between the time the request is received and the time the response is provided to the client. The overall latency includes transaction processing time at the application server 110 (FIG. 1) as well as all related query processing at the database server 120 (FIG. 1). In one embodiment, the latency is measured from the moment of the request arrival at the application server 215 to the time when a prepared reply is sent back to the clients 250.

As used herein and in the claims, a "composite transaction" refers to a transaction that comprises a plurality of transactions. For instance, a given transaction for serving a client's request for information (e.g., a web page) includes embedded therein a plurality of requests/responses for objects (e.g., images, etc.) that form the information (e.g., that form the requested web page). Thus the given transaction for serving the information are considered a composite transaction as it involves various transactions for serving the objects that form such information.

The following example illustrates composite transactions. Clients communicate with a web service (deployed as a multi-tier application) via a web interface, where the unit of activity at the client-side corresponds to a download of a web page generated by the application. In general, a web page is composed of an HTML file and several embedded objects, such as images. A browser retrieves a web page by issue a series of HTTP requests for all objects: first it retrieves the main HTML file, parses it, and then retrieves the embedded images. Client web page requests are called web page views, and a web page accessed by the client and generated by the application is called a transaction.

Moreover, client accesses to a web service occur in the form of a session that includes multiple individual transactions (web pages). For example, in an e-commerce site, placing an order through the web site involves further requests relating to selecting a product, providing shipping information, arranging payment, receiving order confirmation, etc. Thus, for a customer trying to place an order, or a retailer trying to make a sale, the real measure of such a web service performance is its ability to process the entire sequence of individual transactions needed to complete a higher-level logical transaction. The number of such concurrent client sessions that a multi-tier system can support without violating transaction response time is a measure of system capacity that a service provider needs to evaluate. Exemplary embodiments measure client think time for application servers under study. Think time is measured from the moment the client receives a transaction reply until the moment when the client issues the next transaction. Larger think time leads to slower arrival rate of transactions issued to the server by the client session.

The regression-based solver for exemplary embodiments is now discussed in more detail. Exemplary embodiments consider a client web page request as the main, basic unit of client/server activity. As previously mentioned, the application server is often responsible for serving the embedded page images. Thus, one task of exemplary embodiments is to evaluate the overall CPU resources consumed by the application server for corresponding transaction processing (i.e., for generating the requested web page and also retrieving and serving all the corresponding page images).

Exemplary embodiments use a method based on statistical regression technique that provides an efficient and simple way to accurately approximate the CPU cost (overall CPU service time) of different transactions.

Exemplary embodiments compute the CPU costs of transactions and outbound database calls. To capture the changes in user behavior, exemplary embodiments observe a number of different transactions over fixed lengths of time intervals, denoted as monitoring windows. The transaction mix and system utilization are recorded at the end of each monitoring window as shown in Table 2:

TABLE 2

An example of transaction profile in machine 1

| Time (hour) | $N_1$ | $N_2$ | $N_3$ | $N_4$ | ... | $N_{1000}$ | $U_{CPU}$ (%) |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |
| 4 | 22 | 2 | 4 | 7 | ... | 0 | 6.4274 |
| 5 | 38 | 5 | 6 | 7 | ... | 0 | 7.5458 |
| ... | | | | | | | |

For each monitoring window, the transactions observed therein are organized by transaction type, and the resource utilization (e.g., CPU utilization) is recorded for each monitoring window. In general, the different transaction types refer to different activities/functionalities of the application and/or different web pages related to the site and processed by the service provider's hardware under study. The different transaction types are typically present in the application logs. As an example, one type of transaction for a banking application is a transaction in which a client views his or her account balance, while a client transferring funds between accounts might be a second transaction type of the banking application.

In the example of Table 2, five monitoring windows are shown that are each 1 hour in length. In each monitoring window, the number of transactions of a given type is recorded, wherein one or more of the transaction types are composite transactions. For instance, in the example of Table 2, there are 1000 different types of transactions, and the number of occurrences of each transaction type within each monitoring window is recorded. Also, the CPU utilization of each monitoring window is recorded. For instance, the CPU of the system under analysis was utilized 13.3201% of the 1-hour period of time of the first monitoring window shown in Table 2.

For discussion, assume the following denotations for each transaction type i:

(1) $D_i^A$ is the average service time of transactions of the i-th type at the application server, where $1 \leq i \leq M$.

(2) $D_0^A$ is the average CPU overhead related to "keeping the system up" activities at the application server. There are some operating system (OS) processes or background jobs that consume CPU time even when there is no transaction in the system.

(3) $D_{i,j}^{DB}$ is the average service time of type j outbound DB call for transaction $Tr_i$, where $1 \leq j \leq P_i$.

From the utilization law, exemplary embodiments compute the following equation for each monitoring window:

$$D_0^A + \sum_i N_i^A \cdot D_i^A = U_{CPU,1} \cdot T.$$

In this equation, $U_{CPU,1}$ is CPU utilization of the application server (tier 1).

Next, the following equation is obtained:

$$D_0^{DB} + \sum_{i,j} N_{i,j}^{DB} \cdot D_i^{DB} = U_{CPU,2} \cdot T.$$

In this equation, $U_{CPU,2}$ is CPU utilization of the DB server (tier 2).

Next, let $C_i^A$ denote the approximated CPU cost of $D_i^A$ at the application server, and $C_{i,j}^{DB}$ denote the approximated CPU cost of $D_{i,j}^{DB}$ at the DB server.

Exemplary embodiments then calculate an approximated application server utilization $U'_{CPU,1}$ as follows:

$$U'_{CPU,1} = (C_O^1 + \Sigma_i N_i \cdot C_i^A)/T.$$

Exemplary embodiments also calculate an approximated DB server utilization $U'_{CPU,2}$ in a similar way.

To solve these sets of equations, exemplary embodiments use a regression method with an objective to minimize either the absolute error as follows:

$$\sum_k |U'_{CPU} - U_{CPU}|_k$$

or the squared error as follows:

$$\sum_k (U'_{CPU} - U_{CPU})_k^2$$

where k is the index of the monitoring window over time.

By way of example, one embodiment uses a Non-negative Least Squares Regression (Non-negative LSQ) to get $C_i$. This Non-negative LSQ is used to minimize the error as follows:

$$\Box = \left( \sum_k (U'_{CPU} - U_{CPU})_k^2 \right)^{1/2}$$

such that the solution is non-negative.

Figure 3:
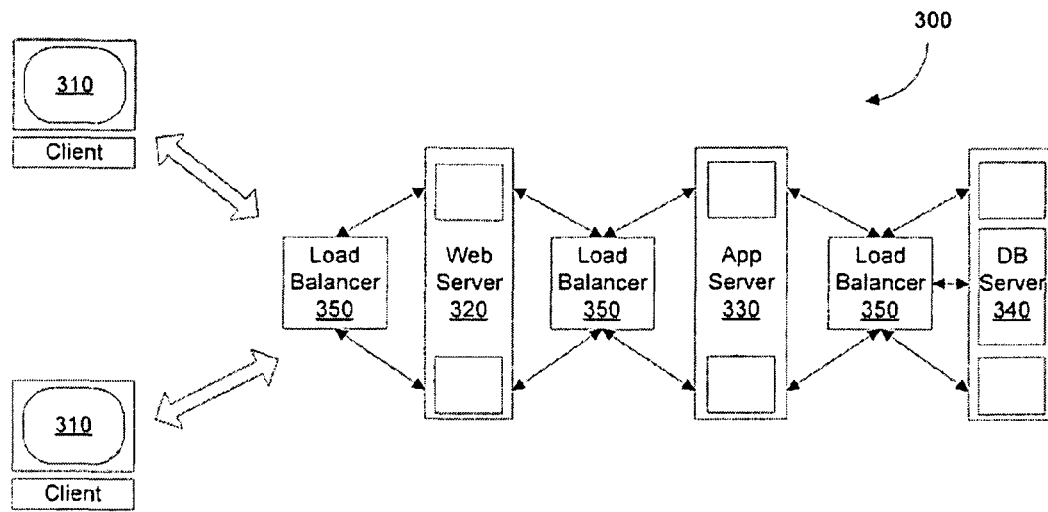
FIG. 3 is a multi-tier computer system in accordance with an exemplary embodiment of the present invention.

Next, the analytical model for exemplary embodiments is discussed in more detail. Internet servers typically use a multi-tiered structure that includes web servers, application servers, and database servers. For example, FIG. 3 shows a multi-tier computer system 300 with a plurality of client computers 310 connected to a web server 320, an application server 330, and a database server 340. Multiple load balancers 350 are connected between the servers 320, 330, and 340.

Each tier gets a request from its preceding tier and can generate certain requests to its successor. For a scalability design, a tier can include several replicated machines. These machines can be heterogeneous, and a dispatcher can use a special load balancing strategy for distributing the incoming requests across the replicated servers.

Figure 4:
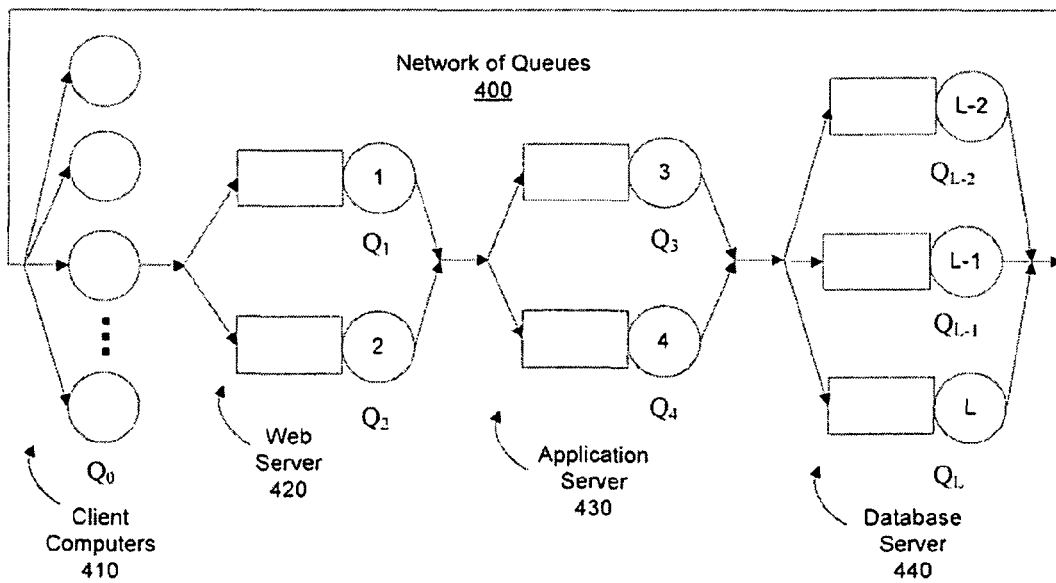
FIG. 4 is a queue model of a multi-tier closed system in accordance with an exemplary embodiment of the present invention.

Due to the session-based client behavior, one exemplary embodiment models the multi-tier system as a closed system with a network of queues. FIG. 4 shows a model of a network of queues 400 with client computers 410 in communication with a web server 420, application server 430, and database server 440.

For discussion, the number of client computers 410 is fixed. When a client computer 410 receives the response from the web server 420, the client waits for a certain think time and then issues another request. This think time is modeled as an infinite queue ($Q_0$) in FIG. 4. Once the service time in each queue is obtained, this closed system is proved to be solved efficiently with a Mean-Value Analysis (MVA) algorithm.

In one embodiment, workload characterization of real traces shows that the workload mix changes over time, and hence the service time is not modeled as a fixed distribution. It is a reasonable assumption, however, for the workload to be within a shorter time interval (for example, one hour). One exemplary embodiment performs the capacity planning procedure for each monitoring window, and then combines the results across these time points to get an overall solution.

Next, the MVA algorithm for exemplary embodiments is discussed in more detail. In one embodiment, the MVA algorithm is based on an assumption that when a new request enters the queue, the system has exactly the same statistics as the system without this new request. This theory applies for any product-form closed system. A description of a detailed MVA algorithm is provided as follows:

Inputs:
N=number of users
Z=think time
L=number of devices
$S_i$=service time per visit to the i-th queue
$V_i$=number of visits to the i-th queue
Outputs:
X=system throughput
$Q_i$=average number of jobs at the i-th queue
$R_i$=average response time of the i-th queue
R=system response time (excluding think time)
$U_i$=utilization of the i-th queue
1. Initialization: for i=1 to L do $Q_i \leftarrow 0$
2. Iterations:

for $n = 1$ to $N$ do
  a. for $i = 1$ to $L$ do
    $R_i = S_i(1 + Q_i)$
  b. $R = \sum_{i=1}^{L} R_i V_i$
  c. $X = n/(Z + R)$
  d. for $i = 1$ to $L$ do $Q_i = XV_i R_i$ 3. for n=1 to L do
a. $X_i = XV_i$
b. $U_i = XS_i V_i$ The visit ratio $V_i$ can be decided by a load balancing policy. For example, if the load balancing policy is equally partitioning with the load across all the machines, then the number of visits $V_s$ to machine s in tier 1 is equal to $1/m_1$, where m is the number of machines in tier 1.

The MVA algorithm takes the number of clients N as input and computes the average performance metrics for a system of N clients. In capacity planning, however, the number of clients is unknown. In contrary, the model needs to be solved for this unknown. For illustration, one embodiment assumes that the Service Level Agreement (SLA) specifies a threshold $T_R$ of the average transaction response time. Then the condition in step 2 of the MVA is changed to "while R≤$T_R$ do" as shown in the algorithm as follows:

Inputs:
N=number of users
Z=think time
L=number of devices
$S_i$=service time per visit to the i-th queue
$V_i$=number of visits to the i-th queue
Outputs:
X=system throughput
$Q_i$=average number of jobs at the i-th queue
$R_i$=average response time of the i-th queue
R=system response time (excluding think time)
$U_i$=utilization of the i-th queue
1. Initialization: for i=1 to L do $Q_i \leftarrow 0$, n←1
2. Iterations:

While $R \leq T_R$ do a. for $i = 1$ to $L$ do $R_i = s_i(1 + Q_i)$ b. $R = \sum_{i=1}^{L} R_i V_i$ c. $X = n/(Z + R)$ d. for $i = 1$ to $L$ do $Q_i = XV_i R_i$ e. $n = n + 1$ 3. for i=1 to L do
a. $X_i = XV_i$
b. $U_i = XS_i V_i$ The detailed sequence steps of one exemplary embodiment are summarized as follows:
1. Workload profiler:
For each monitoring window w, and each machine s:
a. collect the number of transactions $N_{i,s,w}$ of each type i;
b. collect the average utilization $U_{s,w}$.
For each monitoring window w:
a. select the top K most popular transaction types;
b. collect the transaction mix in the system,
   i.e., let the percentage pi of the transactions for type i for all 1≤i≤K;
c. collect the average think time $Z_w$.
2. Regression-based solver:
For each machine s:
Compute the cost function $C_{i,s}$ for each transaction type i as described herein where 1≤i≤K.
3. Analytic model:
For each monitoring window w:
a. approximate the service time $S_s^{front}$ for each $1^{st}$-tier (i.e., front tier or application server) machine s as $$S_s^{front} = \sum_{i=1}^{K} p_i \cdot C_{i,j}^{front};$$

b. approximate the service time $S_s^{DB}$ for each $2^{nd}$-tier (i.e., database server) machine s as $$S_s^{DB} = \sum_{i=1}^{K} p_i \cdot \sum_{j=1}^{t'_i} C_{i,j,s}^{DB};$$

c. compute the maximum number of clients $MAX_w$ can be handled with average response time less than $T_R$ using the MVA algorithm.
Build the profile with entry as (w, $MAX_w$).
Find the minimal $MAX_w$ value X.
X is the number of concurrent customers the system can support
With the average transaction response time less than $T_R$.

In certain embodiments, a representative workload of a system under analysis (e.g., a service provider's deployed system) is obtained from the diagnostics tool as described in connection with FIGS. 1 and 2. This workload includes a plurality of composite transactions that represent actual workload encountered by the system under analysis. Thus, embodiments of the present invention are employed to analyze a "live" workload of a deployed or currently operating system.

Further, in certain embodiments, the resource costs are determined for different tiers of a multi-tier architecture. Thus, exemplary embodiments are disclosed that enable a resource cost (e.g., CPU cost) of different client transactions at different tiers to be determined or approximated. Further, in certain embodiments, the determined resource costs are further analyzed for performing planning, such as for answering capacity planning questions about the computing system under analysis. Thus, in certain embodiments, the determined cost functions are used for evaluating the resource requirement of a scaled or modified transaction workload mix in order to accurately size the future system, for example.

Figure 5:
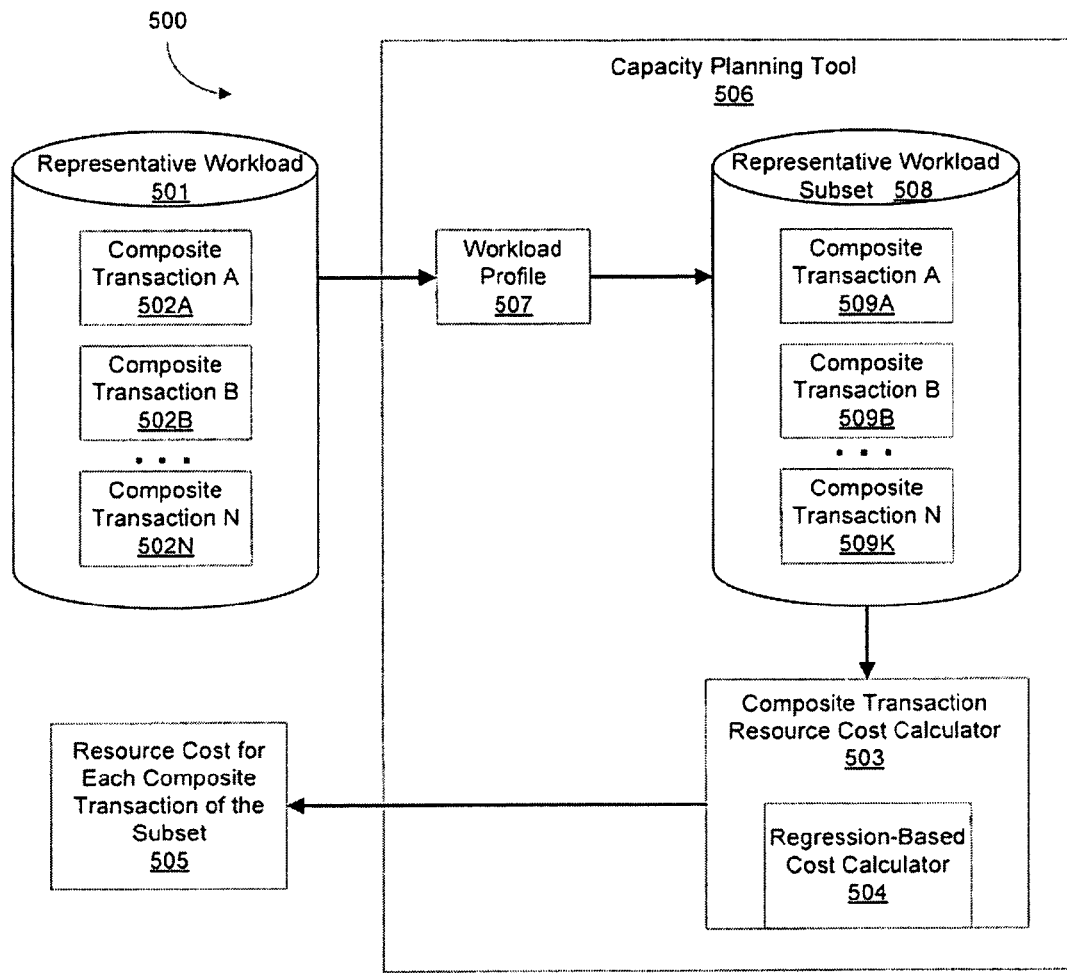
FIG. 5 is an exemplary system for capacity planning in accordance with an exemplary embodiment of the present invention.

FIG. 5 shows an exemplary system 500 for capacity planning according to an embodiment of the present invention. As shown in this example, a representative workload 501 comprises a plurality of composite transactions, such as composite transactions 502A-502N (referred to collectively herein as composite transactions 502).

In the exemplary embodiment of FIG. 5, representative workload 501 is obtained from the diagnostics tool discussed in connection with FIGS. 1 and 2. This workload is actual historical workload collected for a service provider (referred to herein as a "live workload"), for example. Representative workload 501 comprises data representing an actual historical workload collected for a system under analysis over a given period of time, (for example, a preceding one month, two months, three months, etc.). Representative workload 501 comprises data stored to a computer-readable medium, such as memory, hard drive, peripheral data storage drive, optical data storage (e.g., CD, DVD, etc.), magnetic data storage, tape storage, etc. Representative workload 501 can be stored in the form of any suitable data structure, such as to a database, file, table, etc.

System 500 further comprises a workload profiler 507 that receives representative workload 501 and determines a subset 508 thereof. Workload profiler employs techniques to determine a subset 508 of the composite transactions 509A-509K (referred to collectively herein as composite transactions 509) of representative workload 501. Once determined, subset 508 is stored to a computer-readable medium, such as memory, hard drive, peripheral data storage drive, optical data storage (e.g., CD, DVD, etc.), magnetic data storage, tape storage, etc. The subset 508 and/or composite transactions 509 thereof can be stored in the form of any suitable data structure, such as to a database, file, table, etc.

Exemplary system 500 further comprises a composite transaction resource cost calculator ("CTRCC") 503 that receives the determined subset 108. Such CTRCC 503 is operable to analyze the received subset 508 and determine a corresponding resource "cost" 505 for each of the composite transactions 509. In general, the resource cost of a composite transaction reflects an amount of utilization of at least one resource in serving the composite transaction. For example, the resource cost that is computed in certain embodiments is a CPU cost, which is reflective cost amount of CPU utilization attributable to serving the corresponding composite transaction. In certain embodiments, such CPU utilization is a corresponding amount of CPU utilization of a given tier of multi-tier architecture that is attributable to serving the corresponding composite transaction.

In certain embodiments, workload profiler 507 periodically receives a representative workload 501 for a service provider. The CTRCC 503 receives such determined subset 508 to provide an analysis of resource costs 505 for the transactions 509 included in such subset 508.

In certain embodiments, CTRCC 503 employs a regression-based solver 504 for determining the resource cost 505 for the subset 508 of composite transactions 509. The regression-based solver approximates the resource cost (CPU demand) of each application transaction on a given hardware and estimates the CPU cost of each outbound DB call.

In one embodiment, workload profiler 507, CTRCC 503 and/or regression-based solver 504 are implemented as computer-executable software code stored to a computer-readable medium and/or as hardware logic, as examples. Once determined, resource cost 505 is stored to a computer-readable medium, such as memory, hard drive, peripheral data storage drive, optical data storage (e.g., CD, DVD, etc.), magnetic data storage, tape storage, etc. The resource cost 505 can be stored in the form of any suitable data structure, such as to a database, file, table, etc.

In certain embodiments, workload profiler 507 and/or CTRCC 503 are implemented as part of a capacity planning tool 506. In certain embodiments, such a capacity planning tool 506 is operable to further analyze computed resource costs 505 to provide capacity planning analysis for the system under analysis. Such capacity planning tool 506 can be implemented as computer-executable software code stored to a computer-readable medium and/or as hardware logic, for example.

In one embodiment, a service provider deploys a web service as a multi-tier client-server application. In such instances, a client communicates with the web service via a web interface tier, where the unit of activity at the client-side corresponds to a download of a web page generated by the application. A web page is generally composed of a Hypertext Markup language (HTML) file and several embedded objects such as images. A browser retrieves a web page by issuing a series of Hypertext Transfer Protocol (HTTP) requests for all objects: first it retrieves the main HTML file and then after parsing the file, the browser retrieves the embedded images. In one embodiment, a web server and application server reside on the same hardware, and shared resources are used by the application and web servers to generate web pages as well as to retrieve page-embedded objects.

In certain embodiments, the CTRCC 503 further distinguishes a set of unique transaction types and a set of client accesses to them. For static web pages, for example, the Uniform Resource Locator (URL) uniquely defines a file accessed by clients. For dynamic pages, the requests from different users to the same web page URL appears as requests to different URLs due to the client-specific extension or a corresponding parameter list. Thus, in certain embodiments, the CTRCC 503 filters out these client-specific extensions in the reduced trace.

Figure 6:
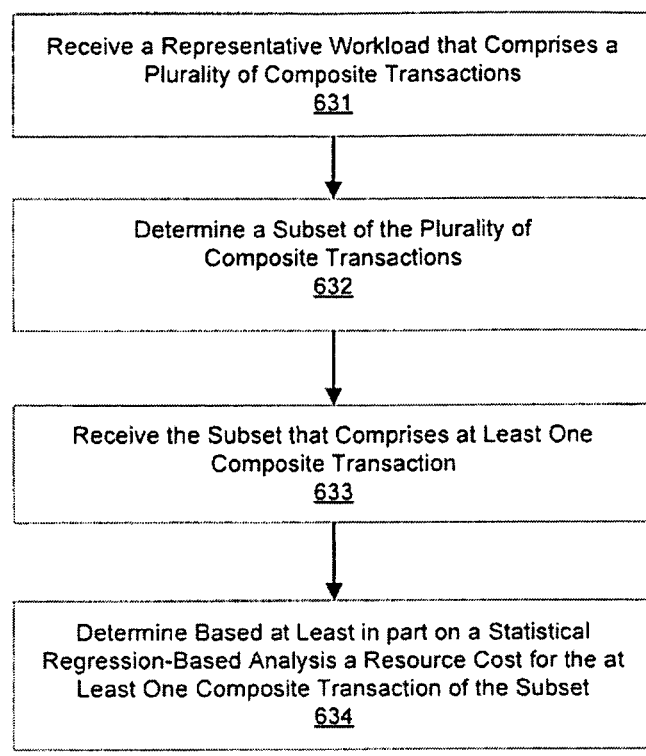
FIG. 6 is an exemplary flow diagram of operational flow in accordance with an exemplary embodiment of the present invention.

FIGS. 5 and 6 are now discussed together. FIG. 6 shows an exemplary operational flow according to one embodiment of the present invention. In operational block 631, workload profiler 507 receives a representative workload 501 of a plurality of composite transactions (e.g., composite transactions 502A-502N of FIG. 5 discovered by the diagnostics tool). In operational block 632, workload profiler 507 determines a subset of the plurality of composite transactions to use for computing resource costs.

In operational block 633, CTRCC 503 receives the determined Subset 508 that comprises at least one composite transaction (e.g., composite transactions 509A-509K of FIG. 5). As mentioned above, the representative workload subset 508 comprises data that represents a representative workload of a computing system under analysis (e.g., represents an actual historical workload of the computing system), and such data is input in any suitable way to CTRCC 503. For instance, CTRCC 503 reads the data from a data structure (e.g., file, database, table, etc.) that is stored to a computer-readable medium, or the data may otherwise be received by CTRCC 503.

In block 634, CTRCC 503 determines, based at least in part on a statistical regression-based analysis (e.g., of regression-based solver 504), a resource cost 505 for the at least one composite transaction of the received subset 508. For instance, a statistical regression-based analysis is employed by regression-based solver 504 to determine (e.g., estimate) a corresponding resource cost 505 for each composite transaction 509 included in the received subset 508 of representative workload 501.

Figure 7:
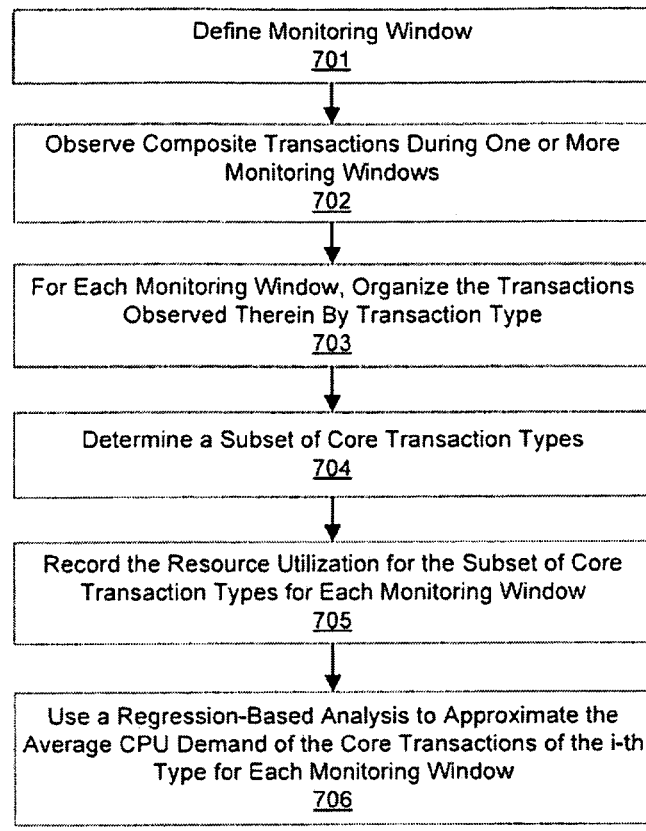
FIG. 7 is an exemplary flow diagram showing statistical regression-based analysis in accordance with an exemplary embodiment of the present invention.

An exemplary statistical regression-based analysis that is employed by regression-based solver 504 according to one embodiment of the present invention is now described with reference to FIG. 7. This exemplary regression-based analysis is described for computing CPU costs of a server for serving web pages, and thus according to this exemplary embodiment, a client web page request is considered as the main, basic unit of client/server activity. However, the exemplary regression-based analysis can be employed for computing CPU (and/or other resource) costs associated with serving other types of composite transactions, and thus is not limited in application to analysis of web page accesses.

As mentioned above, an application server is also responsible for serving the embedded objects of a page (e.g., embedded images, etc.). In one embodiment, the capacity planning tool 506 evaluates the overall CPU resources consumed by the application server for corresponding transaction processing, e.g., for generating the requested web page and also retrieving and serving all the embedded objects in the above example. In other words, one embodiment evaluates the overall CPU resources utilized by a given tier of a multi-tier architecture (e.g., by the application server of a three-tier architecture) in serving a composite transaction.

Embodiments of the present invention described herein are not application dependent. Thus, exemplary embodiments do not require modification of the applications for inclusion of additional logic for explicit instrumentation (and thus do not lead to significant overhead in the operation of the applications for determining resource costs).

According to exemplary embodiments, a number of different transactions are observed over fixed-length time intervals, denoted as monitoring windows, in order to capture the changes in user behaviors. Thus, a monitoring window is defined in operational block 701 of FIG. 7, and a number of different composite transactions are observed in one of more of such monitoring windows in operational block 702. The time length of the monitoring window is user selected. The monitoring window should not be too small (in order to avoid the representative workload contained therein from being too noisy), and the monitoring window should not be too big (in order to avoid overlooking the variance of user activities). By way of example, one hour is a reasonable window length, but the monitoring window length can be determined to be set to some other time period based on the above-mentioned factors.

Next, according to block 703, for each monitoring window, the transactions are organized by transaction type. A determination is then made of a subset of core transactions types according to block 704. The resource utilization is then recorded or stored for the subset of core transaction types for each monitoring window according to block 705. A statistical regression-based analysis is used to approximate the average CPU demand of the core transactions of the i-th type for each monitoring window according to block 706

While the above description has concentrated on evaluating the CPU capacity required for support of a given workload, application of the concepts described herein are not limited to determining such CPU costs. Rather, the regression-based analysis methods described herein can be applied for evaluating other shared system resources that have an "additive" capacity nature. As one example, embodiments of the present invention are applied for estimating the latency of the different links on the network path when end-to-end measurements are given but the link's delay of the path is unknown. As another example, the above-described embodiments are employed for evaluating transactions' memory usage estimates.

In certain embodiments, once the resource cost for composite transactions is determined, such resource cost are used for further analysis, such as for answering capacity planning questions about a system under analysis. By way example, such questions include the following:

(1) How many additional clients can be supported by the existing system i) while still providing the same performance guarantees (Quality of Service (QoS) desires), e.g., response time under 8 seconds, and ii) assuming that new clients perform similar activities as already existing clients in the system, i.e., the system processes the same type of workload?

(2) Does the existing system have enough available capacity for processing an additional service for N number of clients (defined by planning parameters) where the client activities and behaviors are specified as a well-defined subset of the current system activities?

(3) If the current client population doubles, then what is the expected system response time?

The answers to such questions and/or other capacity planning information are determined by capacity planning analyzer and output as capacity planning analysis. Thus, the determined resource costs are used to perform further analysis, such as for analyzing the capacity of the computing system under analysis by capacity planning analyzer.

Figure 8:
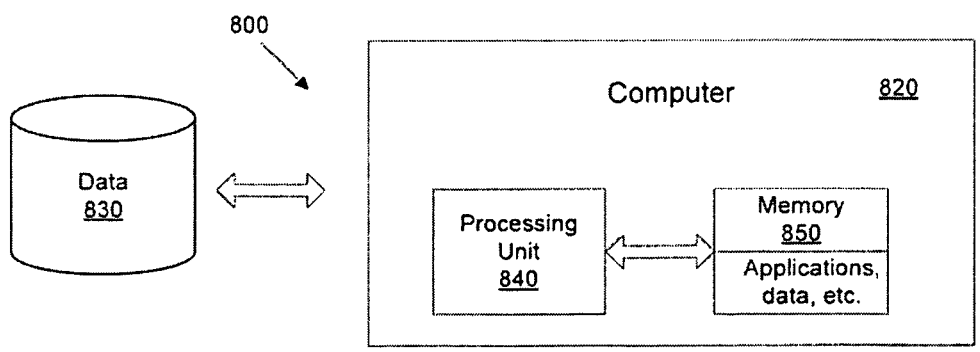
FIG. 8 is an exemplary computer system in accordance with an exemplary embodiment of the present invention.

Embodiments in accordance with the present invention are utilized in or include a variety of systems, methods, and apparatus. FIG. 8 illustrates an exemplary embodiment as a computer system 800 for being or utilizing one or more of the computers, methods, flow diagrams and/or aspects of exemplary embodiments in accordance with the present invention.

The system 800 includes a computer system 820 (such as a host or client computer) and a repository, warehouse, or database 830. The computer system 820 comprises a processing unit 840 (such as one or more processors of central processing units, CPUs) for controlling the overall operation of memory 850 (such as random access memory (RAM) for temporary data storage and read only memory (ROM) for permanent data storage). The memory 850, for example, stores applications, data, control programs, algorithms (including diagrams and methods discussed herein), and other data associated with the computer system 820. The processing unit 840 communicates with memory 850 and data base 830 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    collecting performance data for an application in an application server that issues requests received from a client computer for composite transactions to a database server;
    creating an application log from the performance data; and
    building, based on the application log including the performance data, a model for capacity planning in a multi-tiered architecture for the application, wherein the model estimates processing costs to execute additional composite transactions from client computers.

2. The method of claim 1, wherein the application log includes information on transactions processed during a monitoring window of time.

3. The method of claim 1 further comprising, using a diagnostics probe in the application server to extract information on a number of processed composite transactions at the application server and outbound calls to the database server.

4. The method of claim 1 further comprising, using a regression-based solver to derive Central Processing Unit (CPU) demand for the composite transactions on a given hardware platform.

5. The method of claim 1 further comprising, estimating a Central Processing Unit (CPU) cost of each outbound database call from the application server to the database server.

6. The method of claim 1 further comprising, using byte code instrumentation to collect the performance data, wherein the byte code instrumentation includes byte code that a diagnostics probe inserts into class files of the application as the application is loaded.

7. The method of claim 1 further comprising, using a diagnostics probe to measure execution time of server transactions, count invocations, retrieve arguments, and catch exceptions.

8. A computer system, comprising:
    a memory for storing an algorithm; and
    a processor for executing the algorithm to:
        collect performance data from a diagnostics probe inserted in an application server that processes composite transactions received from a client computer to a database server;
        create an application log from the performance data, wherein the application log provides information on transactions processed during a monitoring window at the application server and the database server; and
        create, based on the application log including the performance data, a model that estimates processor performance of the application server when additional composite transactions are made to the application server.

9. The computer system of claim 8, wherein the processor further executes the algorithm to determine latencies for processing transactions at the application server and analyze the latencies to plan resource usage in a multi-tier architecture.

10. The computer system of claim 8, wherein the processor further executes the algorithm to use a regression-based solver to derive Central Processing Unit (CPU) demand for composite transactions on a given hardware platform.

11. The computer system of claim 8, wherein the processor further executes the algorithm to estimate a Central Processing Unit (CPU) cost of each outbound database call from the application server to the database server.

12. The computer system of claim 8, wherein the processor further executes the algorithm to use byte code instrumentation to collect the performance data, wherein the byte code instrumentation includes byte code that the diagnostics probe inserts into class files of the application as the application is loaded.

* * * * *